(12) United States Patent
Tritt et al.

(10) Patent No.: US 7,814,690 B2
(45) Date of Patent: Oct. 19, 2010

(54) REUSABLE FOLDING SHOPPING LIST WITH EMBEDDED MAGNIFYING LENS

(76) Inventors: Patricia Lucy Tritt, 1330 Moon Dr., Yardley, PA (US) 19067; Michael John Tritt, 1330 Moon Dr., Yardley, PA (US) 19067

( * ) Notice: Subject to any disclaimer, the term of this patent is extended or adjusted under 35 U.S.C. 154(b) by 101 days.

(21) Appl. No.: 12/228,244

(22) Filed: Aug. 11, 2008

(65) Prior Publication Data

US 2009/0056179 A1 Mar. 5, 2009

Related U.S. Application Data

(60) Provisional application No. 60/955,540, filed on Aug. 13, 2007.

(51) Int. Cl.
*G09F 1/00* (2006.01)

(52) U.S. Cl. .................................. 40/124.09

(58) Field of Classification Search ............. 40/124.09, 40/124.11, 124.12, 124.13
See application file for complete search history.

(56) References Cited

U.S. PATENT DOCUMENTS

| | | | | |
|---|---|---|---|---|
| 4,502,236 A | * | 3/1985 | Adrian | 40/365 |
| 4,805,680 A | * | 2/1989 | Ueno | 150/147 |
| 4,819,351 A | * | 4/1989 | Boitani | 40/654.01 |
| 4,881,334 A | * | 11/1989 | Brown | 40/365 |
| 6,769,618 B1 | * | 8/2004 | Finkelstein | 235/487 |
| 2003/0051384 A1 | * | 3/2003 | Miska | 40/789 |
| 2004/0156125 A1 | * | 8/2004 | Graham et al. | 359/804 |
| 2005/0174656 A1 | * | 8/2005 | Yang, Jr. | 359/812 |
| 2006/0225318 A1 | * | 10/2006 | Wilcoxen | 40/124.08 |
| 2006/0226236 A1 | * | 10/2006 | Cullen et al. | 235/487 |

FOREIGN PATENT DOCUMENTS

GB    2208141 A   *   3/1989

* cited by examiner

*Primary Examiner*—Gary C Hoge

(57) ABSTRACT

The invention is an organizational shopping aid that provides categories listing common items that are procured in a supermarket with an embedded magnifying lens to assist in the reading of the small font text found on labels. The objective of this device is to provide an organizational tool that can be incorporated into daily routine and stored easily in a variety of manners that the appeal is not limited to one segment of society.

11 Claims, 4 Drawing Sheets

REUSABLE FOLDING SHOPPING LIST WITH EMBEDDED MAGNIFYING LENS

CROSS REFERENCED TO RELATED APPLICATION

This application is made as a continuation of the Provisional Patent Application No. 60/955,540 filed on Aug. 13, 2007.

BACKGROUND OF INVENTION

The present invention relates generally to shopping aids and more specifically to a reusable system and method including an embedded magnifying lens to aid the shopper in reading packaging text and making selections of various products. With the growing selection of products available in large super grocery stores and the evolution of packaging label requirements, consumers need to process more information during their once simple shopping trips. This device will aid the shopper in creating a comprehensive list of products to purchase, aid the shopper in reading small label text and thus help make informed choices once at the store. The device can also be continuously reused.

DESCRIPTION OF THE PRIOR ART

In preparation for shopping the typical shopper prepares a written list of items to be purchased at the store. Previous art as represented in U.S. Pat. No. 1,729,916 to Vernon, U.S. Pat. No. 489,060 to Wilheim, U.S. Pat. No. 6,644,697 to Schinella, U.S. Pat. No. 4,817,320 to Fraynd, U.S. Pat. No. 4,026,050 to Boles, U.S. Pat. No. 6,000,610 to Talbott et al. all disclose various types of shopping lists, but none of these devises include an embedded magnifying lens to aid in reading small text on packaging. Unlike previous art forms, this guide is presented in a simple and compact form to aid consumers in the organization and planning of the procurement of grocery and household items. With the electronic age other previous art were cumbersome and time consuming and have either required the use of a home PC and printer or have been in the form of a stand alone electronic device that are difficult to operate and require a power source that is subject to possible failure during the shopping trip to the supermarket. Examples of which can be found in U.S. Pat. No. 4,929,819 to Collins Jr., U.S. Pat. No. 4,973,952 to Malec, U.S. Pat. No. 5,047,614 to Bianco.

Other similar art such as U.S. Pat. No. 6,250,006 to Berrier have taken the form of rigid boards that also use laminated surfaces and can be reused, but they are not compact and easily stored for incorporating into daily life. In this and other previous art forms there were no provisions to provide a magnifying device to read small font sizes on food labels. The objective of the Reusable Shopping List with Embedded Magnifying lens is to provide an organizational tool that can be incorporated into daily routine and stored easily in a variety of manners and that the appeal is not limited to one segment of society.

SUMMARY OF THE INVENTION

The present invention relates to a reusable folding shopping list with embedded magnifying lens. Included in the list are categories of items commonly purchased and boxes for indicia to provide shoppers an organized and continuous system used in the procurement of grocery and household items. The reusable folding shopping list is printed on both sides and is laminated with a commercially available film on both sides that is compatible for use with either a standard dry or wet erase marker. The list is folded to allow for easy compact storage and quick reference. The compact size critical to the functionality as it is designed to fit in the majority of women's purses, men's sport or suit jacket interior pockets, briefcases, backpacks, totes and other specific use bags or garments. The reusable folding shopping contains an embedded magnifying lens to assist in the reading of small text that is found on food packaging, product labels, and ingredient lists.

DESCRIPTION OF THE PREFERRED EMBODIMENT

Figure 1:
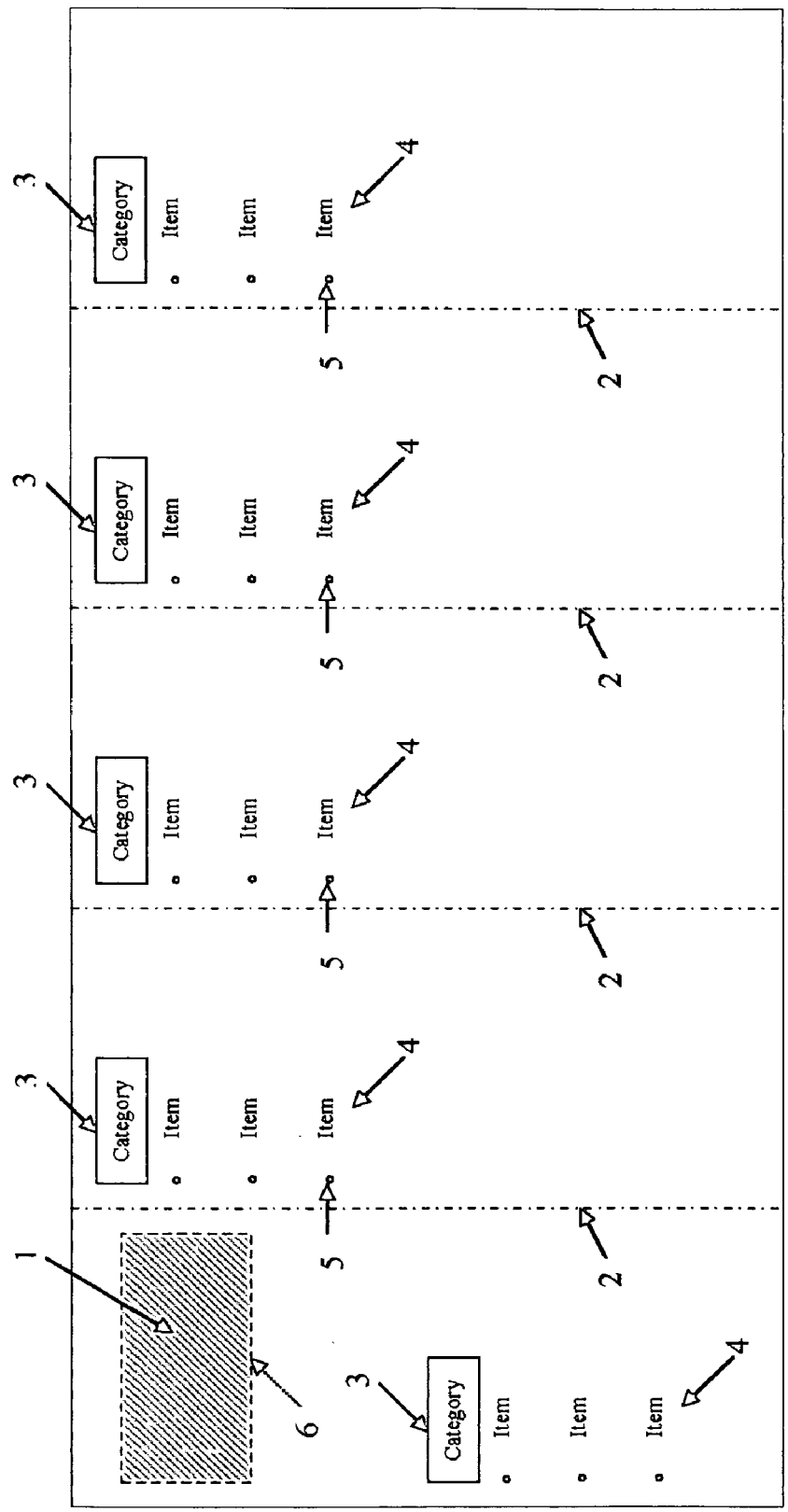
FIG. 1 is a front view of the fully expanded present invention.

For the purpose of promoting an understanding of the present invention, reference will now be made to the embodiments illustrated in the drawings and specific language will be used to describe the same. It is to be understood that no limitation of the scope of the invention is hereby intended, such alterations and further modifications in the illustrated device and method, and such further applications of the principles of the invention as illustrated therein being contemplated as would normally occur to one skilled in the art to which the invention relates.

Figure 2:
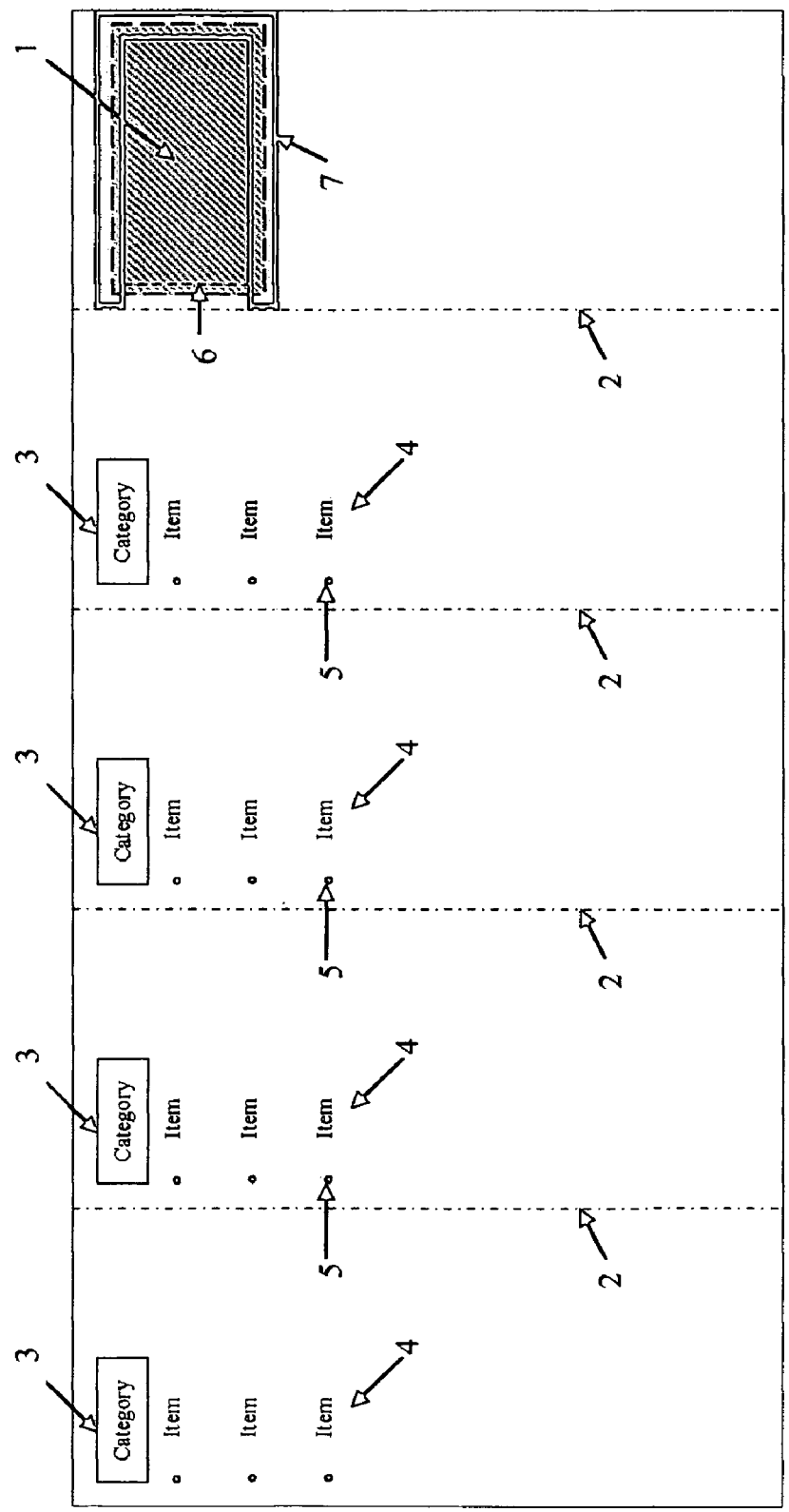
FIG. 2 is a rear view of the fully expanded present invention.

Referring now to FIG. 1, a reusable folding shopping list with embedded magnifying lens 1 has a front surface printed with information and laminated with a commercially available laminate that allows the use of either dry or wet erase markers for indicia. The list and the information contained therein are used in the organized procurement of grocery and household items. The list will be divided into equally sized panels and folded at points indicated by 2 in FIG. 1 and FIG. 2. Each panel is printed with unique information to serve the specific purposes of the invention.

Figure 3:
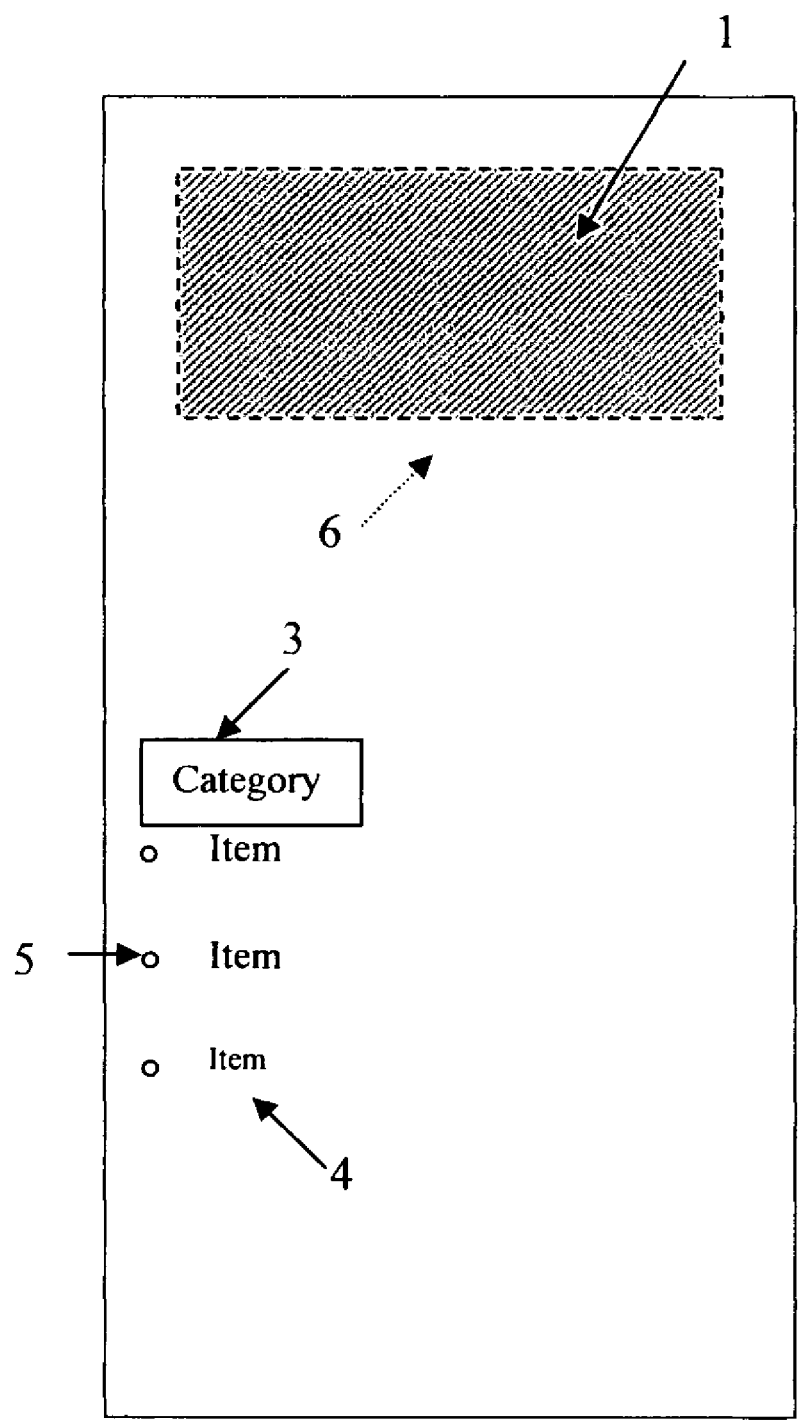
FIG. 3 is a front view of the folded present invention.
Figure 4:
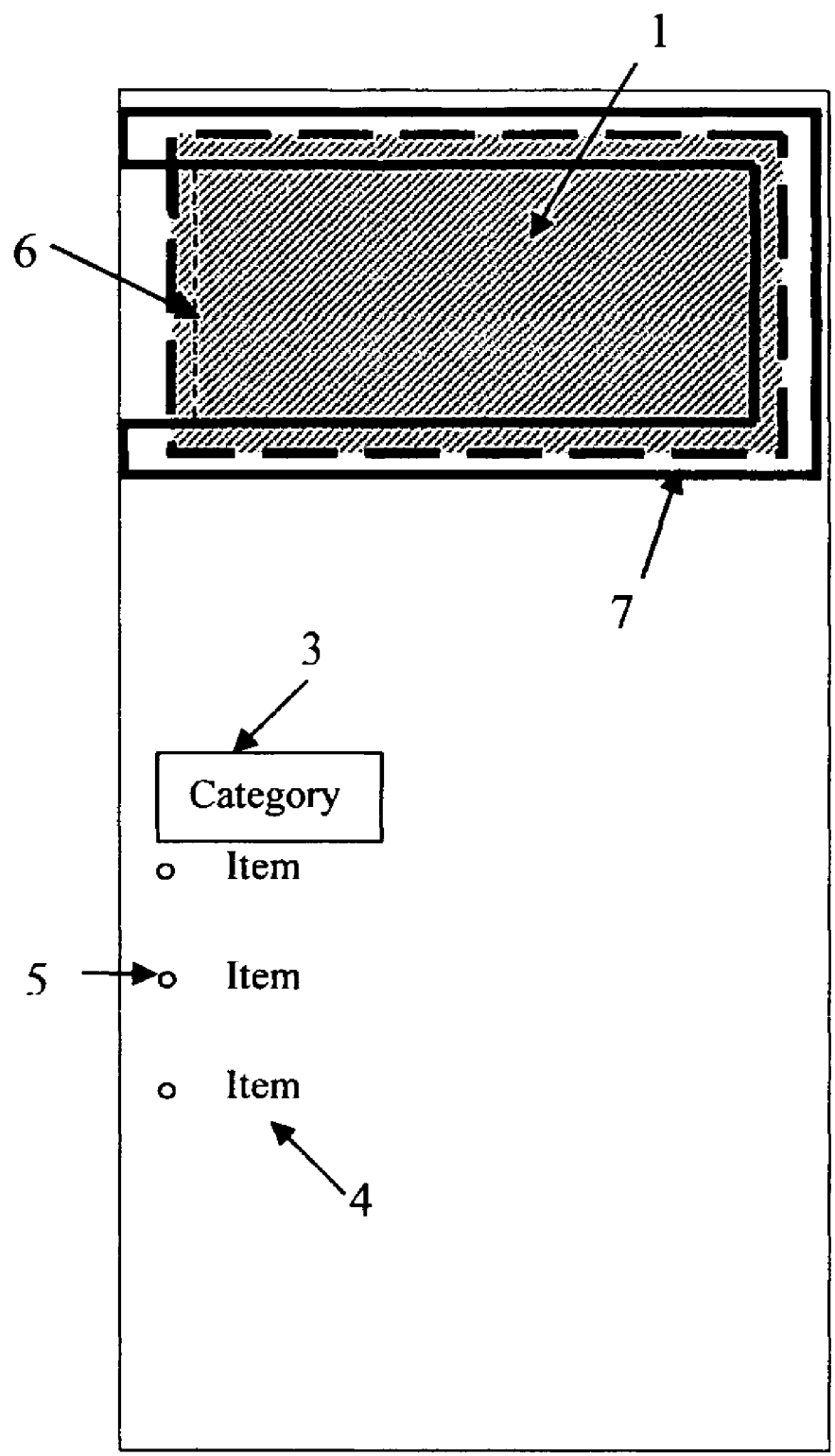
FIG. 4 is a view of the panel containing the embedded magnifying lens and laminated slide pocket

The panel containing the embedded magnifying lens 1 will have an area at the top of the panel that will have a cut out 6 in a rectangular shape to provide the required clear opening for viewing through the lens in the attached position. The magnifying lens can be viewed through both the front and rear surfaces of that panel. As detailed in FIG. 4 the magnifying lens is attached to the panel with a laminated pocket 7 adhered to the panel with an adhesive. The pocket allows the magnifying lens 1 to slide in to a secured position and viewed through the cut out 6 or removed. In this manner the lens can be utilized in the attached position and can also be removed and used independent of the list. The position and orientation of the laminated pocket 7 provides a secure placement of the lens and when the list is in the fully folded position as detailed in FIG. 3, the lens is locked in place. The magnifying lens 1 will be a standard commercially available fresnel lens and will provide magnification of up to 4×.

The shopping list will have three main components: categories 3, items 4 and boxes 5 for indicia. Each category 3 will have a specific title and under each category 3 are specific items 4 corresponding to the category organized alphabetically. The items 4 will be printed on one side of panel dedicated to that category and adjacent to each item will be a box 5 to allow for indicia marked with either a standard wet or dry erase marking pen.

The laminating material selected for the Reusable Shopping List will accommodate the use of either a standard dry or wet erase marker for indicia in the boxes 5 corresponding to the items 4 listed alphabetically in each category 3. This functionality is critical as it allows the user to simply check off the shopping items needed instead of having to re-write the items each week on a new piece of paper which is repetitive as the same goods are typically purchased week after week. The laminating film compatible for use with a dry or wet erase marker and can be easily cleaned with a cloth, so the list can be consistently reused on a daily, weekly or monthly basis depending on the frequency of the consumer's trips to the shopping store. The use of a laminating film is critical to repetitive functionality of the Reusable Shopping List with Embedded Fresnel Lens. The laminating film also provides a protective layer for the printed paper preventing the degradation of the list over time and continued use. As the list is folded paper, the film also provides added strength at each distinct fold 2 in the guide ensuring that the list can be folded and refolded numerous times without any resulting degradation of strength to the underlying paper and guide as a whole.

Another key characteristic of the list is having a comprehensive display of categories 3 and items 4 in alphabetical order to assist the user in remembering what items are running low and need to be re-purchased. Oftentimes consumers will make a mental note of the items needed; however these are forgotten during the course of the week, forgotten when creating a list from scratch on a blank piece of paper, or forgotten during the original shopping trip and thus resulting in sometimes multiple trips to the shopping store which could have been accomplished with one. The list serves to jog the consumer's memory thus making it easier to be organized. With a comprehensive list that is stored in a convenient location and easily incorporated into daily life necessary items will be procured in a more efficient manner.

What is claimed is:

1. A reusable shopping list assembly, comprising:
   a paper sheet;
   graphics printed onto said paper sheet, said graphics including at least one category box, item lines below said category box and check boxes for each of said item lines;
   transparent plastic laminates enveloping said paper sheet;
   a cut out formed through said laminates and said paper sheet;
   a transparent pocket formed over said cut out; and
   a selectively removable magnifying lens received within said transparent pocket, wherein said magnifying lens optically magnifies objects viewed through said cut out when said magnifying lens is in said transparent pocket.

2. The assembly according to claim 1, further including a plurality of parallel fold lines formed in said laminates that subdivide said laminates and said paper sheet into a plurality of smaller sections.

3. The assembly according to claim 2, wherein each of said smaller sections has the same size.

4. The assembly according to claim 1, wherein said magnifying lens is a fresnel lens.

5. The assembly according to claim 2, wherein said graphics are printed on each of said smaller sections.

6. A reusable shopping list assembly, comprising:
   a laminated paper sheet;
   graphics printed onto said paper sheet;
   a cut out formed through said laminated paper sheet;
   a transparent pocket formed over said cut out; and
   a magnifying lens received by said transparent pocket, wherein said magnifying lens is removable from said transparent pocket and optically magnifies objects viewed through said cut out when held within said transparent pocket.

7. The assembly according to claim 6, wherein said graphics include at least one category box, item lines below said category box and check boxes for each of said item lines.

8. The assembly according to claim 7, further including a plurality of parallel fold lines formed in said laminates that subdivide said laminates and said paper sheet into a plurality of smaller sections.

9. The assembly according to claim 8, wherein each of said smaller sections has the same size.

10. The assembly according to claim 9, wherein said graphics are printed on each of said smaller sections.

11. The assembly according to claim 6, wherein said magnifying lens is a fresnel lens.

* * * * *